United States Patent
Solis

(10) Patent No.: US 9,882,964 B2
(45) Date of Patent: Jan. 30, 2018

(54) EXPLICIT STRATEGY FEEDBACK IN NAME-BASED FORWARDING

(71) Applicant: CISCO TECHNOLOGY, INC., San Jose, CA (US)

(72) Inventor: Ignacio Solis, South San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 352 days.

(21) Appl. No.: 14/455,639

(22) Filed: Aug. 8, 2014

(65) Prior Publication Data

US 2016/0043960 A1 Feb. 11, 2016

(51) Int. Cl.
*G06F 15/173* (2006.01)
*H04L 29/08* (2006.01)
*H04L 12/725* (2013.01)
*H04L 12/24* (2006.01)

(52) U.S. Cl.
CPC ............ *H04L 67/10* (2013.01); *H04L 45/306* (2013.01); *H04L 67/327* (2013.01); *H04L 41/0893* (2013.01); *Y04S 40/162* (2013.01)

(58) Field of Classification Search
None
See application file for complete search history.

(56) References Cited

U.S. PATENT DOCUMENTS

| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |

(Continued)

FOREIGN PATENT DOCUMENTS

| CN | 103873371 | 6/2014 |
| DE | 1720277 A1 | 6/1967 |

(Continued)

OTHER PUBLICATIONS

Fall, K. et al., "DTN: an architectural retrospective", Selected areas in communications, IEEE Journal on, vol. 28, No. 5, Jun. 1, 2008, pp. 828-835.

(Continued)

*Primary Examiner* — Umar Cheema
*Assistant Examiner* — Anthony Rotolo

(57) ABSTRACT

One embodiment provides a system that facilitates explicit strategy feedback in a Content-Centric Network (CCN). During operation, the system sends a first interest associated with an explicit strategy feedback request via an egress interface. This egress interface is in a plurality of egress interfaces associated with a same name in a forwarding table. An interest is location-independent and uniquely identifies the content object in the CCN and is routed based on the name in the CCN. The system stores one or more parameters received in response to the explicit strategy feedback request in an entry, which includes the name and the egress interface, in the forwarding table. The one or more parameters are associated with a first device. The system determines, for a second interest for a content object associated with the name, an egress interface from the plurality of egress interfaces based on the stored parameters.

24 Claims, 11 Drawing Sheets

(56) References Cited

U.S. PATENT DOCUMENTS

| | | |
|---|---|---|
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 * | 2/2016 | Oran .......... H04L 67/327 |
| 9,280,610 B2 | 3/2016 | Gruber |
| 2002/0002680 A1 | 1/2002 | Carbajal |

(56) References Cited

U.S. PATENT DOCUMENTS

| | | |
|---|---|---|
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Paterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1* | 4/2008 | Suzuki ............... H04L 41/5003 370/390 |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |

(56) References Cited

U.S. PATENT DOCUMENTS

| | | |
|---|---|---|
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |

(56) References Cited

U.S. PATENT DOCUMENTS

| | | |
|---|---|---|
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1* | 8/2013 | Qian ............... H04L 67/327 709/241 |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1* | 8/2014 | Xie .................. H04L 45/44 370/400 |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |

(56) References Cited

FOREIGN PATENT DOCUMENTS

| WO | 2013123410 | 8/2013 |
| WO | 2015084327 | 6/2015 |

OTHER PUBLICATIONS

Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
B. Lynn$2E.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM Wkshps), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh, C. Gentry, and B. Waters, "Collusion Resistant Broadcast Encryption With Short Ciphertexts and Private Keys".
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. "12th Annual Network and Distributed System Security Symposium (NDSS), Feb. 2, 2005".
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.

(56) References Cited

OTHER PUBLICATIONS

Gupta, Anjali, Barbara Liskov, and Rodrigo Rodrigues. "Efficient Routing for Peer-to-Peer Overlays." NSDI. vol. 4. 2004.
H. Xiong, X. Zhang, W. Zhu, and D. Yao. CloudSeal: End-to$2.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.

(56) References Cited

OTHER PUBLICATIONS

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.

(56) References Cited

OTHER PUBLICATIONS

Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* *figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.

* cited by examiner

EXPLICIT STRATEGY FEEDBACK IN NAME-BASED FORWARDING

BACKGROUND

Field

This disclosure is generally related to forwarding in a network. More specifically, this disclosure is related to strategy feedback for network-name-based forwarding.

Related Art

In many computing applications, it is often important for devices in a network to express interests for their respective collections of data. The proliferation of digital content creates a vast number of collections, which require reconciliation. Content-Centric Network (CCN) architectures have been designed to facilitate accessing such digital content. These networks include entities, or nodes, such as network clients, forwarders (e.g., routers and switches), and content producers, which communicate with each other by sending "interest" packets for various content items and receiving "response" packets comprising content objects in return. Unlike a traditional Internet Protocol (IP) network, where an object is tied to its location and its IP address, the content objects in a CCN are identified based on a specific name, which is location-independent.

For example, a border router that is connected to multiple areas of a computer network can subscribe to namespaces for those areas (e.g., "Area 1" and "Area 2"). Other routers that are not border routers may only subscribe to a single area. This way, a router that subscribes to the namespace "Area 1" only obtains network-configuration items for Area 1, and a router that subscribes to the namespace "Area 2" only obtains network-configuration items for Area 2. The border router that subscribes to both namespaces can obtain network-configuration items for Area 1 and Area 2.

Because a network-configuration item's structured name is unique and persistent, a node in a CCN can generate a hash value for each network-configuration item based on the structured name, without having to process the data for each content item. The node can also generate an additive hash for each routing-data collection, based on the hashes for the individual network-configuration items of a routing-data collection, so that the additive hash represents the contents of the routing-data collection. For example, the node can generate the additive hash by using an addition operation (or some other mathematical function) to process the hashes for the individual network-configuration items of the routing-data collection.

In a CCN, a node requests an object using an interest based on the persistent name of the object. A node requesting the object can be referred to as a consumer. This interest can be forwarded to any producer node of the object. As a result, a node in the CCN can have a forwarding database comprising a plurality of producer nodes for the same content name. For efficient forwarding, the node relies on a forwarding strategy to select the producer node to which the interest should be forwarded. Hence, the node can use a forwarding strategy to perform this selection. Though CCN brings many desirable features to a network, some issues remain unsolved for an efficient forwarding strategy.

SUMMARY

One embodiment provides a system that facilitates explicit strategy feedback in a Content-Centric Network (CCN). During operation, the system sends a first interest associated with an explicit strategy feedback request via an egress interface. This egress interface is in a plurality of egress interfaces associated with a same name in a forwarding table. An interest is location-independent and uniquely identifies the content object in the CCN and is routed based on the name in the CCN. The system stores one or more parameters received in response to the explicit strategy feedback request in an entry, which includes the name and the egress interface, in the forwarding table. The one or more parameters are associated with a first device. The system determines, for a second interest for a content object associated with the name, an egress interface from the plurality of egress interfaces based on the stored parameters.

In a variation on this embodiment, the first interest is an individual interest for the explicit strategy feedback request.

In a variation on this embodiment, the first interest is for a content object associated with the name and the explicit strategy feedback request is piggybacked in the first interest.

In a variation on this embodiment, the one or more parameters are received from an underlying Routing Information Base (RIB) storing a route associated with the name.

In a variation on this embodiment, the parameters received in response to the explicit strategy feedback request are one or more of: server load, server disk space, server cost, storage cost, server processing power, network cost, expected service time, network congestion, network reliability, server energy load, server energy consumption, network energy load, and network energy consumption.

In a variation on this embodiment, the system removes the one or more parameters from a response message associated with the first interest in response to the response message reaching a boundary of an administrative domain.

In a variation on this embodiment, the one or more parameters are further associated with a second device, and aggregated for the first and second devices based on an aggregation policy.

In a further variation, the aggregation policy includes one or more of: a mean, a median, the minimum, the maximum, and an inclusive list.

BRIEF DESCRIPTION OF THE FIGURES

In the figures, like reference numerals refer to the same figure elements.

DETAILED DESCRIPTION

Figure 1:
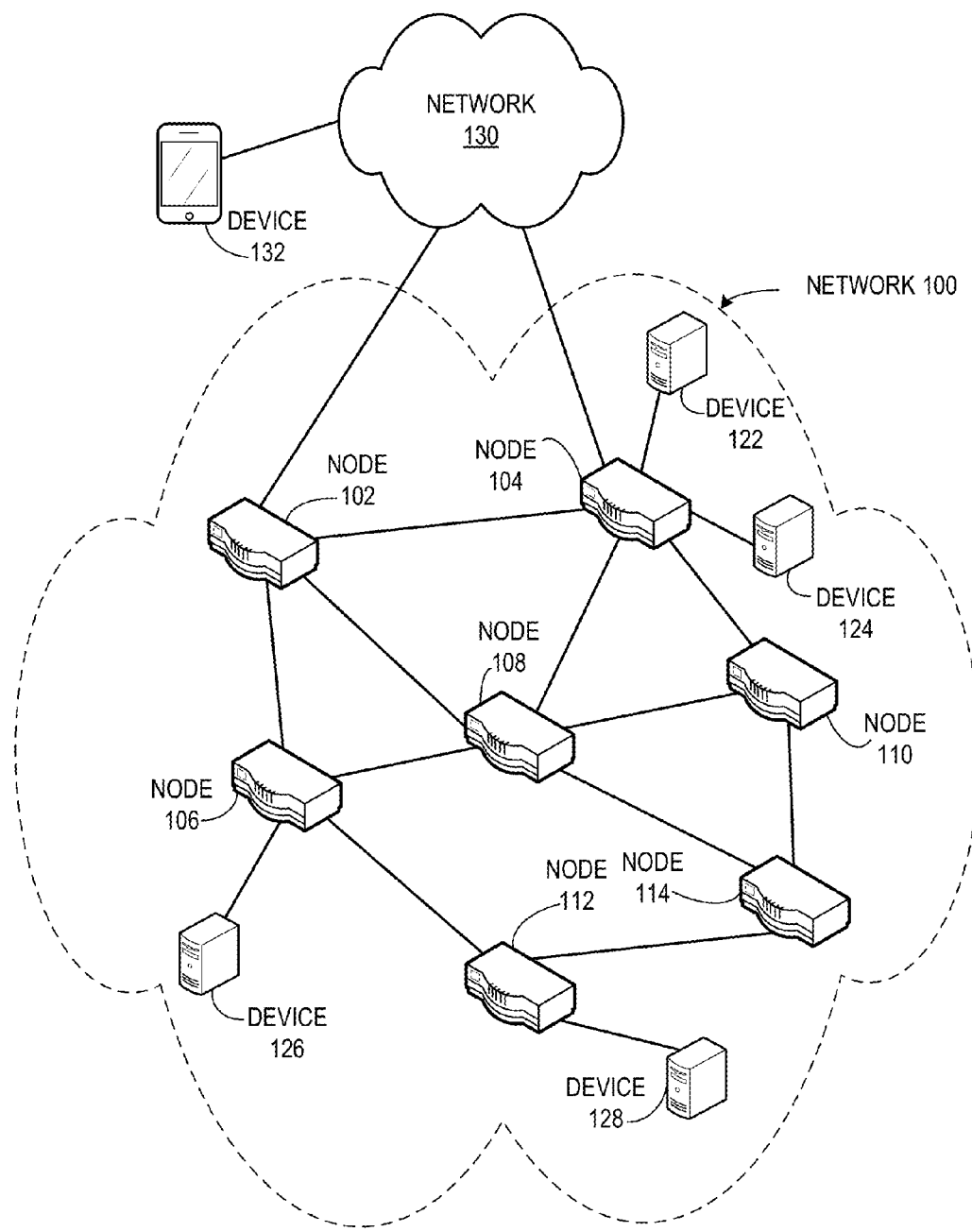
FIG. 1 illustrates an exemplary Content-Centric Network (CCN) with explicit strategy feedback support, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In embodiments of the present invention, the problem of facilitating an efficient forwarding strategy is solved by providing explicit strategy feedback to a forwarding node. In a Content-Centric Network (CCN), a consumer node can obtain a content object (CO) (i.e., a new content item), or an object, at any time by broadcasting an interest packet comprising the persistent name of the object. This interest packet can be referred to as an interest. In this disclosure, the terms "content object" and "object" are used interchangeably. Any producer node (e.g., a server) hosting the content object can respond to that interest and send a response packet comprising the content object to the consumer node. This response packet can be referred to as a response.

A forwarding node (e.g., the consumer node or an intermediate node) can forward the interest to any of the producer nodes. Hence, the forwarding table in the forwarding node can include a plurality of entries for the same content object (i.e., the same name) corresponding to the plurality of producer nodes. As a result, the forwarding node decides the producer node to which the interest should be forwarded based on a forwarding strategy. Without an efficient forwarding strategy, the forwarding node may not be able to select the entry in its forwarding table that is most suitable for the CCN (e.g., has a lower latency or congestion).

To solve this problem, embodiments of the present invention facilitate explicit strategy feedback for a forwarding node. The forwarding node sends an explicit feedback request in an interest to a respective producer node of a content object (i.e., for a respective entry for the name of the content object). This feedback request can be for one or more parameters (e.g., server resource or network condition). Upon receiving the feedback request, the corresponding producer node can send a response comprising the requested feedback. The feedback request and/or the feedback can be in an individual or piggybacked message. The forwarding node can store the feedback in the corresponding forwarding table entry and use the feedback to determine the producer node to which the interest should be forwarded. In this way, a forwarding node becomes aware of the parameters that determine efficient forwarding and can use the parameters to efficiently forward an interest in a CCN.

In some embodiments, the network clients, network nodes (e.g., forwarders such as routers), and publishers communicate over an information-centric network (ICN). In ICN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independently from the data's storage location, network location, application, and means of transportation. In other words, the name can be used to route the interest and the data in ICN. A Named-Data Network (NDN) or a CCN are examples of ICN architecture; the following terms describe elements of an NDN or CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in an ICN is typically location-independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish among different versions of the content item, such as a collaborative document.

In some embodiments, the name can include a non-hierarchical identifier, such as a hash value that is derived from the content object's data (e.g., a checksum value) and/or from elements of the content object's name. A hash-based name is described in U.S. patent application Ser. No. 13/847,814, titled "Ordered-Element Naming for Name-Based Packet Forwarding," by inventor Ignacio Solis, filed 20 Mar. 2013, the disclosure of which is incorporated by reference herein. A name can also be a flat label. Hereinafter, "name" is used to refer to any name for a piece of data in an NDN, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or interest across an information-centric network, which CCN/NDN routers can propagate toward a storage device (e.g., a cache server) or a data producer that can provide the requested data to satisfy the request or interest.

In some embodiments, the ICN system can include a CCN architecture. However, the methods disclosed herein are also applicable to other ICN architectures as well. A CCN architecture is described in U.S. patent application Ser. No. 12/338,175, titled "Controlling the Spread of Interests and Content in a Content Centric Network," by inventors Van L. Jacobson and Diana K. Smetters, filed 18 Dec. 2008, the disclosure of which is incorporated by reference herein.

In this disclosure, the term "feedback" is used in a generic sense. Any information that is associated with a device capable of receiving and/or transmitting based on network names can be referred to as "feedback." Examples of feedback include, but are not limited to, server load, server disk space, server cost, storage cost (e.g., in monitory value), server processor/processing power, network cost (e.g., in monitory value), expected service time, network congestion, network reliability, server energy load, server energy consumption, network energy load, and network energy consumption.

Network Architecture

FIG. 1 illustrates an exemplary Content-Centric Network (CCN) with explicit strategy feedback support, in accordance with an embodiment of the present invention. Network 100 includes nodes 102, 104, 106, 108, 110, 112, and 114. These nodes can be CCN routers or other forwarders, and consumer and/or producer nodes. For example, content-producing devices 122, 124, 126, and 128 can operate as producer nodes. On the other hand, nodes 102 and 104 are coupled to an external network 130 (e.g., an Internet Protocol (IP) network) and serve as ingress nodes for a request for a content object from device 132.

During operation, device 132 requests a content object for which devices 122 and 124 are producer nodes. If device 132 is a node that supports forwarding and/or routing based on network names (e.g., a CCN node), this request can be an interest for the content object expressed in a routable name associated with the content object. In some embodiments, this name is an HSVLI. If network 130 does not support forwarding and/or routing based on network names (e.g., an IP network, which supports routing based on IP addresses), the interest can be tunneled through network 130 to nodes 102 or 104. On the other hand, if device 132 does not support forwarding and/or routing based on network names, the request can be an IP packet (which can be in an Ethernet frame). In some embodiments, upon receiving this IP packet, node 102 or 104 generates the corresponding interest for the content object in network 100.

In network 100, nodes forward interests to destinations via prefix name matching. Suppose that node 104 receives the interest for a content object, which is associated with a network name "/movies/blockbuster/mp4/." Node 104 can forward this interest to any producer node that advertises the prefix "/movies." In other words, node 104 can forward this interest via any route which advertises the prefix "/movies." Suppose that devices 122 and 124 advertise the prefix "/movies." Upon receiving the advertisements, node 104 creates corresponding forwarding entries for devices 122 and 124.

For the received interest, node 104 determines whether to forward the interest to device 122 or to device 124 based on a forwarding strategy. This determination is based on the forwarding strategy taken by a strategy layer. The strategy layer makes decisions based on one or more forwarding strategies. Since both devices 122 and 124 advertise the prefix "/movies," node 104 has multiple options for forwarding the interest in its forwarding table. The strategy layer determines which entry associated with the prefix "/movies" in the forwarding table should be used to forward the interest.

For example, a forwarding strategy can be selecting alternate entries in the forwarding table for devices 122 and 124 based on a round robin model. Another forwarding strategy can be selecting the first forwarding entry added (or discovered) to the forwarding table, and selecting a second forwarding entry if the egress link of the first forwarding entry becomes unavailable. A more complex forwarding strategy can to maintain statistics of the traffic forwarded using a respective forwarding entry and use those statistics to select the forwarding entry. For example, if the maintained statistics records the average latency associated with a respective forwarding entry for devices 122 and 124, the strategy layer can forward using the forwarding entry with the lowest latency. In this way, the strategy layer of node 104 can obtain feedback from the network implicitly based on the traffic that goes through node 104. This way of obtaining strategy feedback can be referred to as implicit strategy feedback.

Another way of obtaining these statistics involves explicitly requesting and receiving the strategy feedback, which can be referred to as explicit strategy feedback. For example, node 104 can request explicit strategy feedback for one or more parameters (e.g., available resources and network conditions) from devices 122 and 124. Suppose that the strategy feedback is for the server load of devices 122 and 124. During operation, node 104 can send an interest comprising the strategy feedback request to device 122. Node 104 can generate an individual interest comprising the explicit strategy feedback request or piggyback (e.g., append or prepend) the explicit strategy feedback request in an interest forwarded to device 122. For example, if node 104 receives an interest for a content object from device 132, node 104 can include the explicit strategy feedback request in the interest and forward the interest toward device 122.

Upon receiving the request, device 122 can generate a response comprising the server load of device 122. Device 122 can generate an individual response comprising the server load as the content object (e.g., a signed content object of CCN) or piggyback (e.g., append or prepend) the server load in a response forwarded to node 104. For example, this response can carry the content object referred to by the name in the interest, and the server load can be piggybacked in the response. In some embodiments, node 104 can obtain the explicit strategy feedback from an underlying Routing Information Base (RIB), which stores locally computed routes for different name prefixes. It should be noted that the RIB can also include routes for different IP prefixes.

Upon receiving the server load of device 122, in some embodiments, node 104 can store the server load in the forwarding table entry for device 122 associated with the prefix "\movies." Similarly, node 104 can receive the server load from device 124 and stores the server load in the forwarding table entry for device 124 associated with the prefix "\movies." Upon receiving another interest, the strategy layer compares the server loads of devices 122 and 124 and determines the forwarding entry that includes a lower server load. Node 104 then identifies an egress interface associated with the determined forwarding entry and forwards the interest via the identified egress interface. In this disclosure, the terms "interface" and "ports" are used interchangeably. In some embodiments, the forwarding entry includes the prefix (e.g., "\movies"), an egress interface (e.g., the interface via which an advertisement for the prefix has been received), and the explicit strategy feedback (e.g., server load). In this example, node 104 receives the explicit strategy feedback from devices 122 and 124 via respective interfaces associated with devices 122 and 124, and stores the received explicit strategy feedback in corresponding entries of its forwarding table.

Suppose that node 102 receives the interest for another content object, which is associated with a network name "/music/topchart/mp3/." Node 102 can forward this interest to any producer node that advertises the prefix "/music." In other words, node 102 can forward this interest via any route which advertises the prefix "/movies." Suppose that devices 126 and 128 advertise the prefix "/music." Upon receiving the advertisements, node 102 creates corresponding forwarding entries for devices 126 and 128. For the received interest, the strategy layer of node 102 determines whether to forward the interest to device 126 or to device 128 based on a forwarding strategy. Since both devices 126 and 128 advertise the prefix "/music," node 102 has multiple options for forwarding the interest in its forwarding table. The strategy layer determines which entry associated with the prefix "/music" in the forwarding table should be used to forward the interest.

Similarly, intermediate node 106 also receives an advertisement for the prefix "/music" from devices 126 and 128. Upon receiving the advertisements, node 106 creates corresponding forwarding entries for devices 126 and 128. For the received interest, the strategy layer of node 106 determines whether to forward the interest to device 126 or to device 128 based on a forwarding strategy. If node 102 sends individual or piggybacked strategy feedback requests to devices 126 and 128, node 106 receives these strategy feedback requests. In some embodiments, node 102 sends the explicit strategy feedback request via an interface from which node 102 has received the advertisement for the prefix "/music," and whichever node or device has sent an advertisement for the prefix "/music" can send explicit strategy feedback.

Upon receiving the explicit strategy feedback request, node 106 forwards the strategy feedback request via a respective interface from which it has received an advertisement for the prefix "/music." For example, node 106 forwards an explicit strategy feedback request via the interface that couples device 126 for the advertisement from device 126, and via the interface that couples node 112 for the advertisement from device 128. Device 126 receives the strategy feedback request and sends individual or piggybacked strategy feedback to node 106.

When node 112 receives the strategy feedback request from node 106, node 112 forwards the strategy feedback request via a respective interface from which it has received an advertisement for the prefix "/music." For example, node 112 forwards the strategy feedback request via the interface that couples device 128 for the advertisement from device 128. Device 128 receives the strategy feedback request and sends individual or piggybacked strategy feedback to node 112, which, in turn, sends strategy feedback to node 106. In some embodiments, node 106 can send respective strategy feedback from devices 126 and 128 to node 102. In some further embodiments, node 106 aggregates the strategy feedback from devices 126 and 128 based on an aggregation policy. Examples of an aggregation policy include, but are not limited to, a mean, a median, a minimum, a maximum, and a list (or vector) of the strategy feedback from devices 126 and 128. Node 106 then sends the aggregated strategy feedback to node 102 in an individual or piggybacked response. This allows node 106 to send fewer messages and provides faster convergence.

In some embodiments, strategy feedback is specifically for a node, and an intermediate node may not recognize the strategy feedback. This intermediate node simply forwards the strategy feedback via the interface from which it has received the strategy feedback request. For example, strategy feedback from device 128 can be specifically for node 106. Intermediate node 112 may not recognize the strategy feedback, and sends the strategy feedback via the interface from which node 112 has received the explicit strategy feedback request from node 106.

In some embodiments, explicit strategy feedback remains within an administrative domain. For example, if network 100 is an administrative domain, explicit strategy feedback from device 122 or 126 reaches up to node 102 or 104, and does not leave network 100. When device 132 sends an interest to node 104, and node 104 piggybacks explicit strategy feedback request in that interest, devices 122 or 124 can also send explicit strategy feedback piggybacking in a response, which can include a content object, to the interest for device 132. However, when that response reaches node 104, node 104 extracts the explicit strategy feedback from the response, and forwards the response comprising the content object to device 132. This keeps the parameters associated with the explicit strategy feedback within network 100. In this way, these parameters do not leave an administrative domain and remain hidden from external devices (e.g., device 132).

Communication for Explicit Strategy Feedback

Figure 2A:
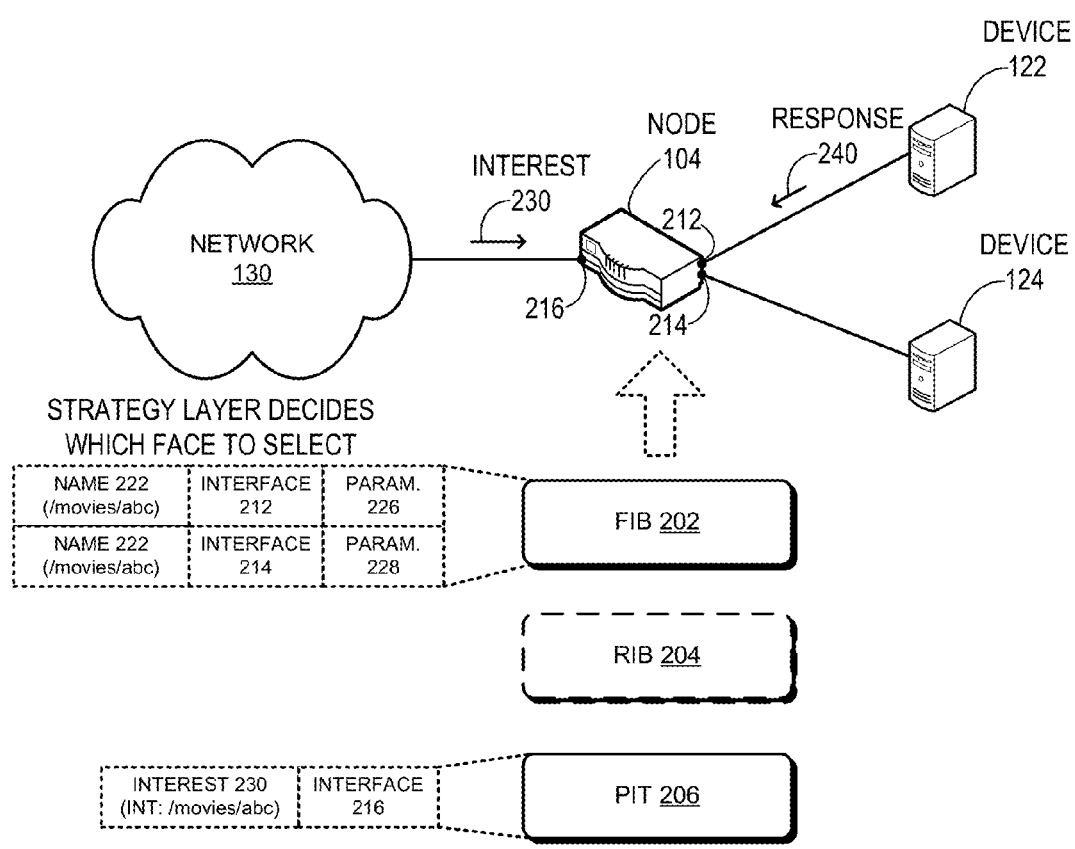
FIG. 2A illustrates an exemplary forwarding strategy in a CCN with explicit strategy feedback support, in accordance with an embodiment of the present invention.

FIG. 2A illustrates an exemplary forwarding strategy in a CCN with explicit strategy feedback support, in accordance with an embodiment of the present invention. Node 104 includes a Forwarding Information Base (FIB) 202. FIB 202, which is a forwarding table, includes one or more entries, wherein a respective entry includes a prefix and an egress interface for the prefix. In some embodiments, the entry also includes one or more parameters associated with the prefix and the egress interface. During operation, node 104 receives advertisements for a network name 222 (e.g., "/movies/abc") from devices 122 and 124 via interfaces 212 and 214, respectively. Switch 104 creates forwarding entries in FIB 202 for a respective advertisement for name 222 received from distinct interfaces. For example, FIB 202 includes two entries for name 222 corresponding to devices 122 and 124, and their corresponding interfaces 212 and 214. This allows switch 104 to forward an interest for name 222 via one of interfaces 212 and 214.

The strategy layer of switch 104 determines the interface to which switch 104 should forward an interest for name 222. Switch 104 can send individual or piggybacked explicit strategy feedback requests to devices 122 and 124 for one or more parameters. Devices 122 and 124, in turn, send individual or piggybacked explicit strategy feedback to switch 104. In some embodiments, switch 104 stores the received parameters in FIB 202 in corresponding entries. For example, switch 104 can obtain parameters 226 and 228 from devices 122 and 124, respectively, and store parameters 226 and 228 in entries associated with devices 122 and 124, respectively, in FIB 202. Suppose that parameters 226 and 228 represent server loads of devices 122 and 124, respectively. The corresponding entries associated with devices 122 and 124 in FIB 202 then include the respective server loads of devices 122 and 124.

In some embodiments, node 104 can obtain the explicit strategy feedback from an underlying Routing Information Base (RIB) 204, which stores locally computed routes for different name prefixes. During this route computation for RIB 204, switch 104 can discover a "path cost" associated with a route, and this cost can in included in RIB 204. Switch 104 can obtain this cost from RIB 204 and store that cost in a corresponding entry in FIB 202. For example, when switch 104 computes a route to device 122, switch 104 computes a path cost to device 122, and this cost can be parameter 226 associated with device 122 in FIB 202. It should be noted that RIB 204 can also include routes for different IP prefixes.

If node 104 receives an interest 230 for name 222 (e.g., "/movies/abc") from network 130 (e.g., from device 132) via interface 216, switch 104 creates an entry in a Pending Interest Table (PIT) 206 for interest 230. In some embodiments, the entry includes interest 230 (e.g., name 222) and the ingress interface 216 of interest 230. Based on parameters 226 and 228, the strategy layer of switch 104 selects an egress interface for interest 230 from interfaces 212 and 214. Suppose that the strategy layer selects interface 212, which corresponds to device 122. Switch 104 forwards interest 230 via interface 212. Switch 104 can include (i.e., piggyback) an explicit strategy feedback request in interest 230 for device 122. This explicit strategy feedback request can be signed by switch 104 and can be part of the name in interest 230. This explicit strategy feedback request can be also be unsigned and can be appended or prepended to the name in interest 230.

Device 122 receives the interest and identifies the content object associated with name 222. Device 122 generates a response 240 comprising name 222 and the corresponding content object. Device 122 sends response 240 to switch 104. If interest 230 includes an explicit strategy feedback request, device 122 can include (i.e., piggyback) the corresponding explicit strategy feedback in response 240. This explicit strategy feedback request can be signed by device 122 and can be part of the content object in response 240. This explicit strategy feedback request can be also be unsigned and can be appended or prepended to the signed content object in response 240. Upon receiving response 240, switch 104 identifies the entry in PIT 206 comprising name 222, identifies interface 216 based on the entry, and forwards response 240 via interface 216.

Figure 2B:
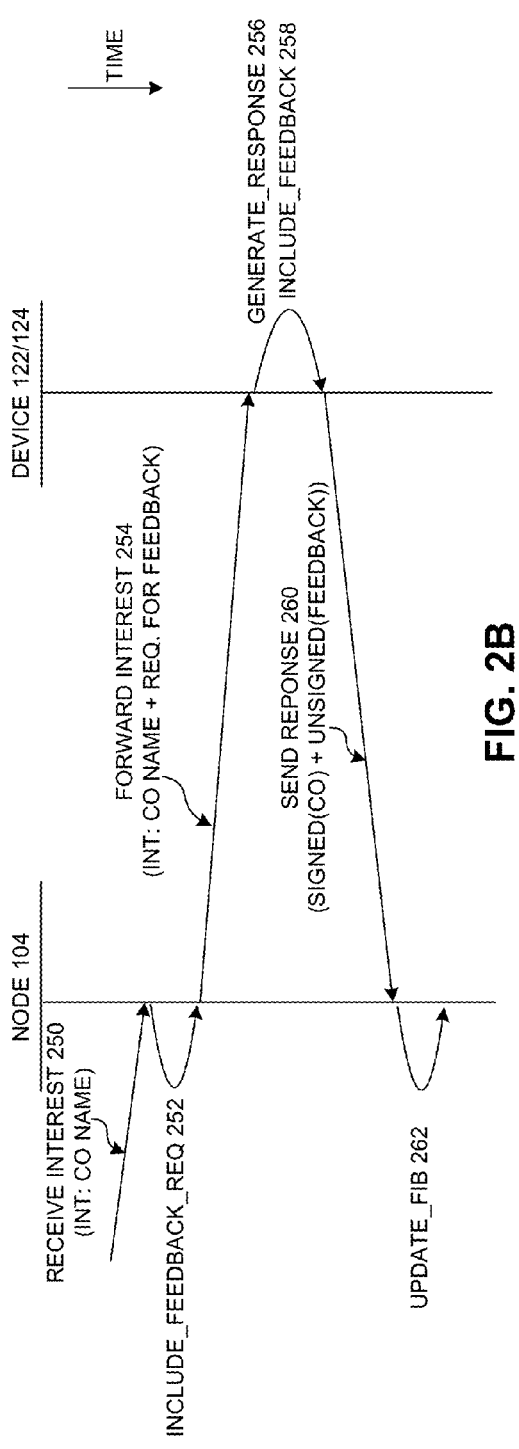
FIG. 2B illustrates an exemplary communication of piggybacked explicit strategy feedback in a CCN, in accordance with an embodiment of the present invention.

FIG. 2B illustrates an exemplary communication of piggybacked explicit strategy feedback in a CCN, in accordance with an embodiment of the present invention. During operation, node 104 in CCN 100 receives interest 250 comprising a content object name. Node 104 performs procedure include_feedback_req 252 to include a piggybacked explicit strategy feedback request in request 250. In this way, node 104 generates an interest 254 comprising the content object name and the piggybacked explicit strategy feedback request. In some embodiments, the explicit strategy feedback request can be a network name, which can be used to route in CCN 100. Node 104 then transmits interest 254. As interest 254 moves through CCN 100 from node 104, device 122 or 124 receives interest 254 and, based on the content object name in interest 254, determines that the local device (i.e., device 122 or 124) hosts the content object.

Device 122 or 124 performs procedure generate_response 256 to generate a response message 260 comprising the content object. In some embodiments, this content object is signed by device 122. Device 122 or 124 then performs include_feedback 258 to include the corresponding explicit strategy feedback in response 260. Upon inclusion, device 122 or 124 sends response 260 comprising the signed content object and the unsigned explicit strategy feedback. Upon receiving response 260, node 104 performs procedure update_FIB 262 to update the local FIB based on the explicit strategy feedback in response 260. For example, if the explicit strategy feedback is the server load, node 104 includes the received server load in the FIB entry corresponding to the device from which the explicit strategy feedback is received.

Figure 2C:
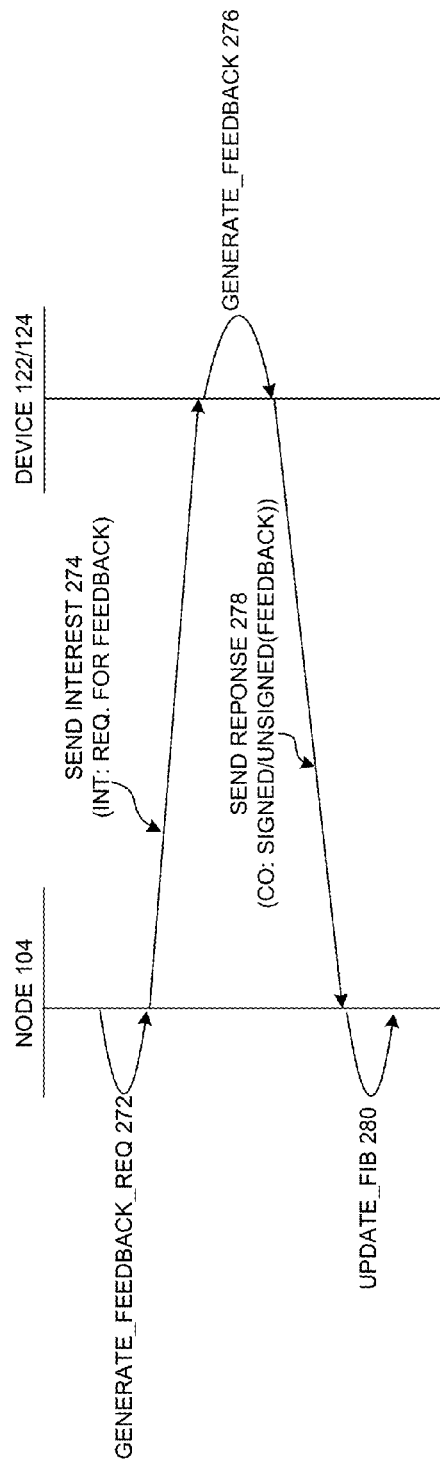
FIG. 2C illustrates an exemplary communication of individual explicit strategy feedback in a CCN, in accordance with an embodiment of the present invention.

FIG. 2C illustrates an exemplary communication of individual explicit strategy feedback in a CCN, in accordance with an embodiment of the present invention. During operation, node 104 in CCN 100 performs procedure generate_feedback_req 272 to generate an individual explicit strategy feedback request by generating an interest 274 comprising the explicit strategy feedback request. In some embodiments, the explicit strategy feedback request can be a network name, which can be used to route in CCN 100. Node 104 then transmits interest 274. As interest 274 moves through CCN 100 from node 104, device 122 or 124 receives interest 274 and, based on the explicit strategy feedback request, determines that the local device (i.e., device 122 or 124) should send a response comprising explicit strategy feedback.

Device 122 or 124 performs procedure generate_feedback 276 to generate a response message 278 comprising the explicit strategy feedback. In some embodiments, this explicit strategy feedback is signed by device 122. In other words, this explicit strategy feedback can be a content object. This content object can correspond to the network name in the explicit strategy feedback request from node 104. Upon generating response 278, device 122 or 124 sends response 278 comprising the explicit strategy feedback. Upon receiving response 278, node 104 performs procedure update_FIB 280 to update the local FIB based on the explicit strategy feedback in response 278. For example, if the explicit strategy feedback is the server load, node 104 includes the received server load in the FIB entry corresponding to the device from which the explicit strategy feedback is received.

Operations of Explicit Strategy Feedback

Figure 3A:
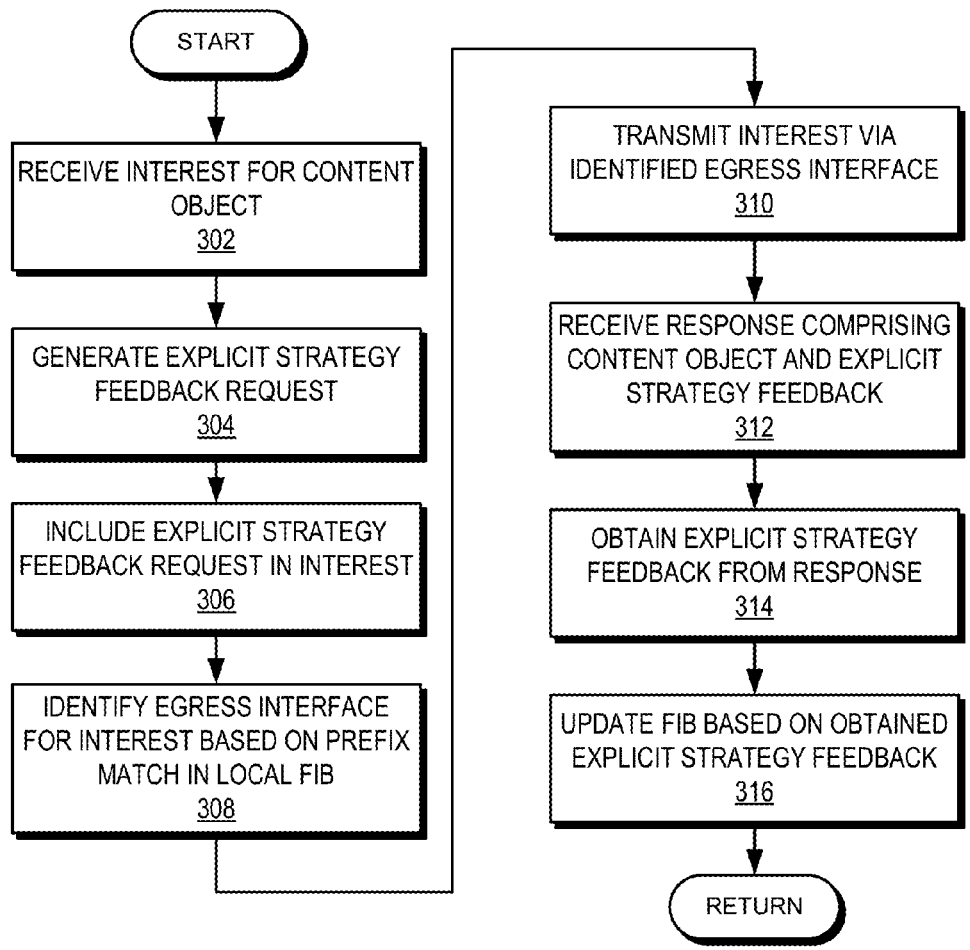
FIG. 3A presents a flowchart illustrating the process of a node generating a piggybacked explicit strategy feedback request, in accordance with an embodiment of the present invention.

FIG. 3A presents a flowchart illustrating the process of a node generating a piggybacked explicit strategy feedback request, in accordance with an embodiment of the present invention. During operation, the node receives an interest for a content object (operation 302). The node generates an explicit strategy feedback request (operation 304) and includes the explicit strategy feedback request in the interest (operation 306), as described in conjunction with FIG. 2B. The node identifies an egress interface for the interest based on a prefix match in the local FIB (operation 308). For example, the node matches the name in the interest with the prefixes in its FIB, and based on a prefix match (e.g., the longest prefix match), identifies an egress interface.

The node then transmits the interest via the identified egress interface (operation 310). The node receives a response comprising a content object and explicit strategy feedback (operation 312). The node obtains the explicit strategy feedback, which can be unsigned, from the response (operation 314) and updates the local FIB based on the explicit strategy feedback (operation 316), as described in conjunction with FIG. 2B.

Figure 3B:
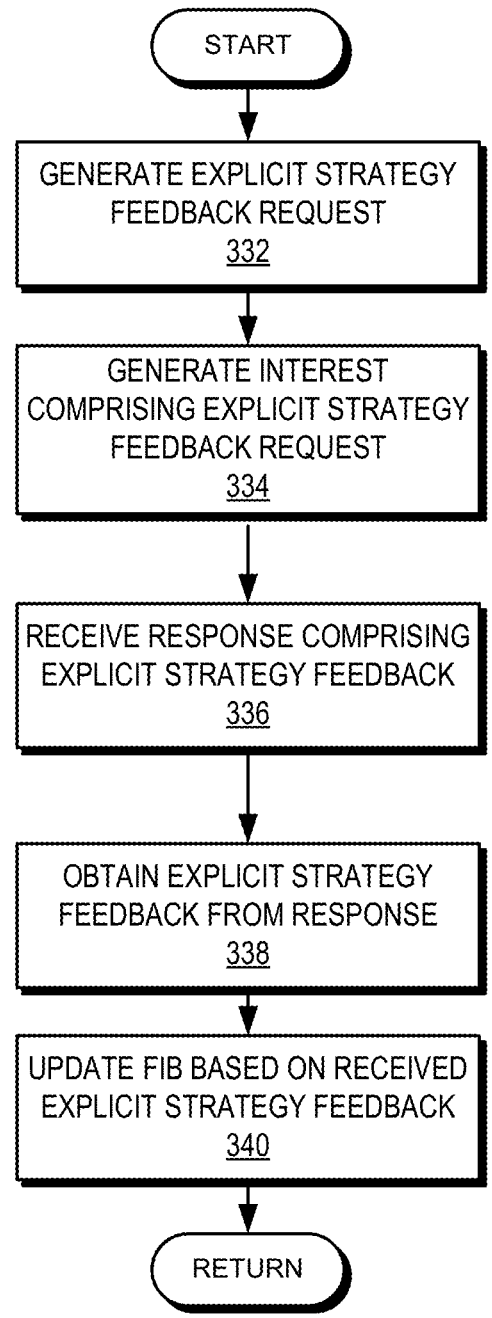
FIG. 3B presents a flowchart illustrating the process of a node generating an individual explicit strategy feedback request, in accordance with an embodiment of the present invention.

FIG. 3B presents a flowchart illustrating the process of a node generating an individual explicit strategy feedback request, in accordance with an embodiment of the present invention. During operation, the node generates an explicit strategy feedback request (operation 332) and generates an interest comprising the explicit strategy feedback request (operation 334), as described in conjunction with FIG. 2B. The node receives a response comprising the explicit strategy feedback (operation 336), obtains the explicit strategy feedback from the response message (operation 338), and updates the FIB based on the received explicit strategy feedback (operation 340).

Figure 3C:
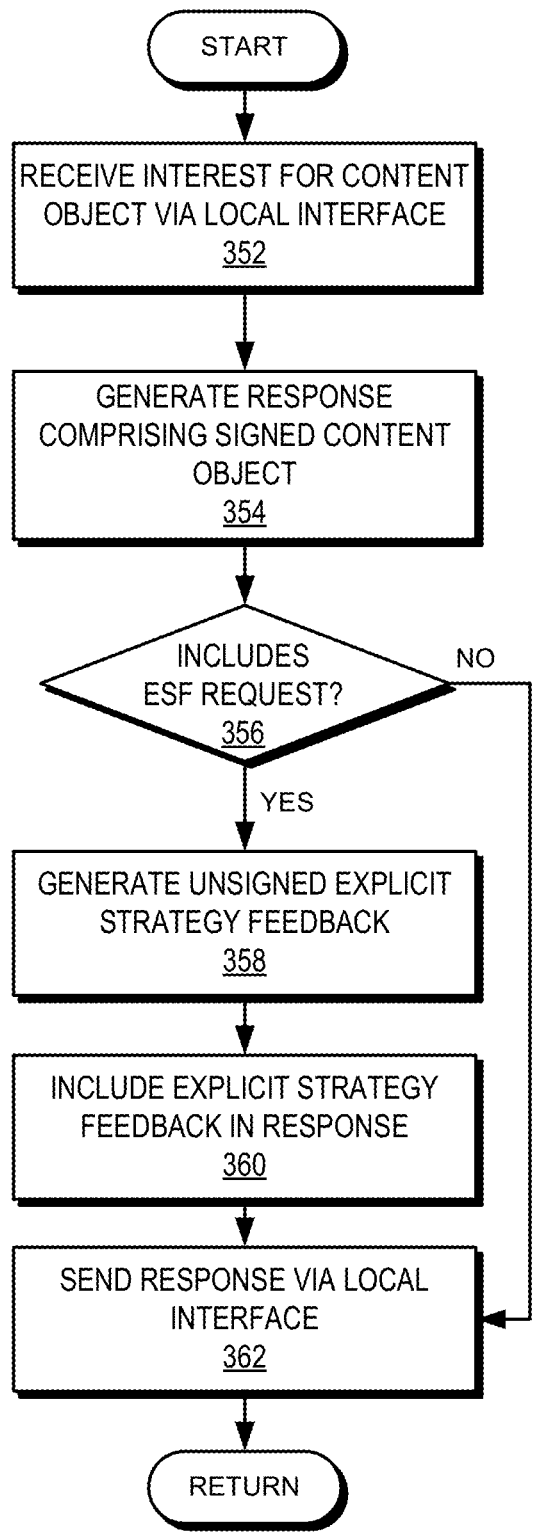
FIG. 3C presents a flowchart illustrating the process of a node generating a piggybacked explicit strategy feedback, in accordance with an embodiment of the present invention.

FIG. 3C presents a flowchart illustrating the process of a node generating a piggybacked explicit strategy feedback, in accordance with an embodiment of the present invention. During operation, the node receives an interest for a content object via a local interface (operation 352). The node generates a response comprising the content object (operation 354). In some embodiments, this content object can be signed (e.g., with a public key). The node then checks whether the interest includes an explicit strategy feedback request (operation 356). If so, the node generates unsigned explicit strategy feedback (operation 358) and includes the explicit strategy feedback in the response (operation 360). If the interest does not include an explicit strategy feedback request (operation 356) or explicit strategy feedback has been included in the response (operation 360), the node sends the response via the local interface (operation 362). This local interface can be the same interface via which the node received the interest.

Figure 3D:
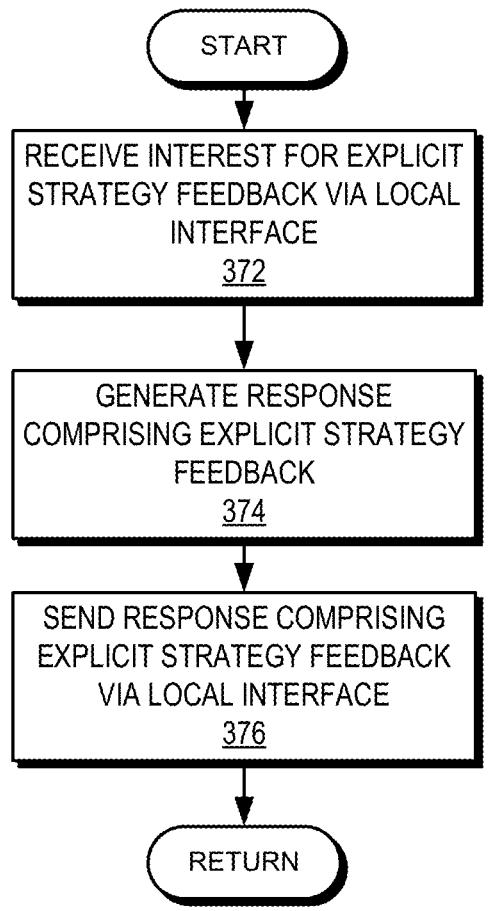
FIG. 3D presents a flowchart illustrating the process of a node generating an individual explicit strategy feedback, in accordance with an embodiment of the present invention.

FIG. 3D presents a flowchart illustrating the process of a node generating an individual explicit strategy feedback, in accordance with an embodiment of the present invention. During operation, the node receives an interest for explicit strategy feedback (e.g., an explicit strategy feedback request expressed in a network name) via a local interface (operation 372). The node generates a response comprising explicit strategy feedback (operation 374). The node then sends the response comprising the explicit strategy feedback via the local interface (operation 376). This local interface can be the same interface via which the node received the interest. In some embodiments, the explicit strategy feedback can be signed by the node (e.g., with the public key of the node) and is represented as a content object.

Figure 4A:
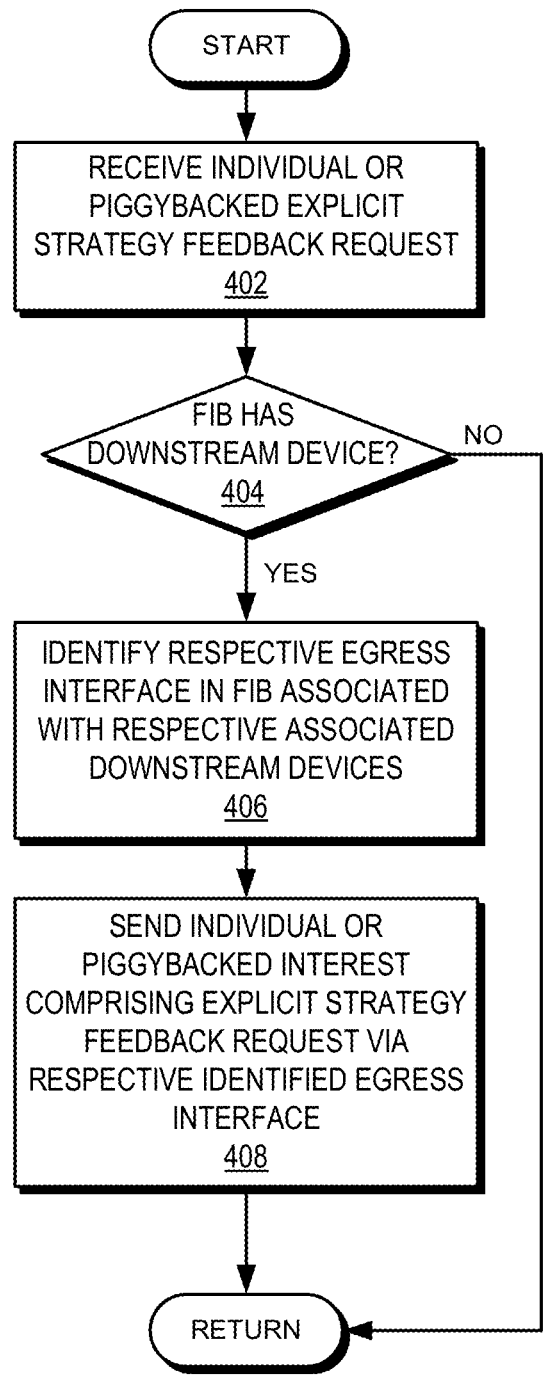
FIG. 4A presents a flowchart illustrating the process of an intermediate node forwarding an interest with an explicit strategy feedback request, in accordance with an embodiment of the present invention.

FIG. 4A presents a flowchart illustrating the process of an intermediate node forwarding an interest with an explicit strategy feedback request, in accordance with an embodiment of the present invention. During operation, the node receives an individual or piggybacked explicit strategy feedback request (operation 402). The node then checks whether the FIB of the node includes a downstream device associated with the explicit strategy feedback request (e.g., is advertising a prefix for which the explicit strategy feedback request has been generated) (operation 404). If so, the node identifies a respective egress interface associated with a respective associated downstream device (operation 406) and sends an individual or piggybacked interest comprising an explicit strategy feedback request via a respective identified egress interface (operation 408).

Figure 4B:
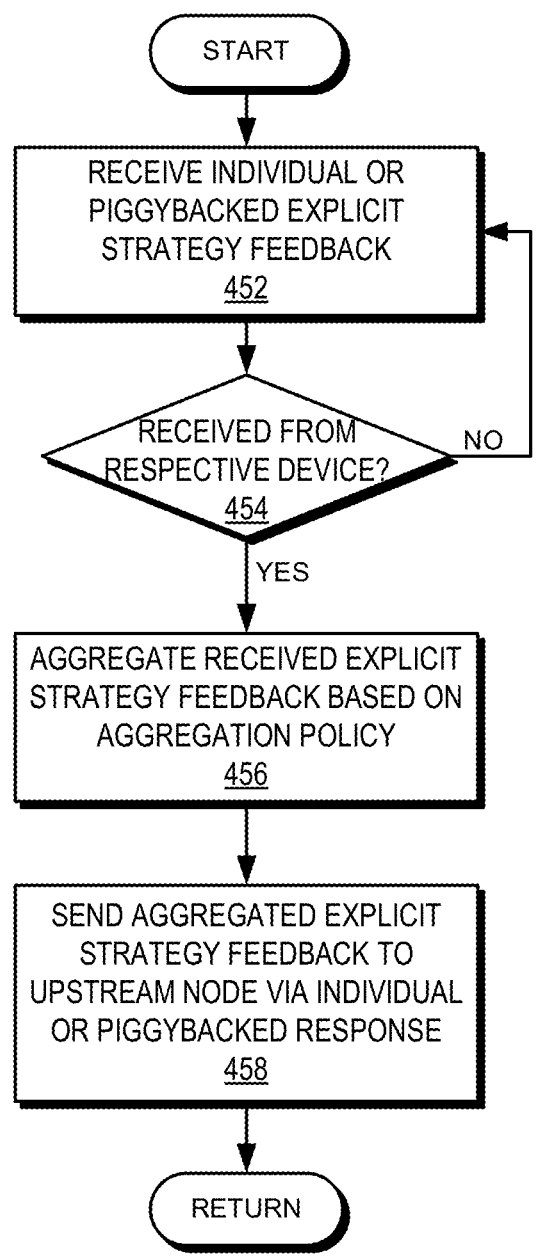
FIG. 4B presents a flowchart illustrating the process of an intermediate node forwarding a response with explicit strategy feedback, in accordance with an embodiment of the present invention.

FIG. 4B presents a flowchart illustrating the process of an intermediate node forwarding a response with explicit strategy feedback, in accordance with an embodiment of the present invention. During operation, the node receives individual or piggybacked explicit strategy feedback (operation 452) and checks whether the node has received explicit strategy feedback from a respective downstream device (operation 454). If not, the node continues to receive individual or piggybacked explicit strategy feedback (operation 452). In some embodiments, explicit strategy feedback from different downstream devices can be different (e.g., individual or piggybacked). If the node has received explicit strategy feedback from a respective downstream device, the node aggregates the received explicit strategy feedback based on an aggregation policy (operation 456). Examples of an aggregation policy include, but are not limited to, a mean, a median, a minimum, a maximum, and a list (or vector) of the strategy feedback from devices. The node sends the aggregated explicit strategy feedback to an upstream node via an individual or piggybacked response (operation 458), as described in conjunction with FIG. 1.

Explicit Strategy Feedback for Service Clusters

Figure 5:
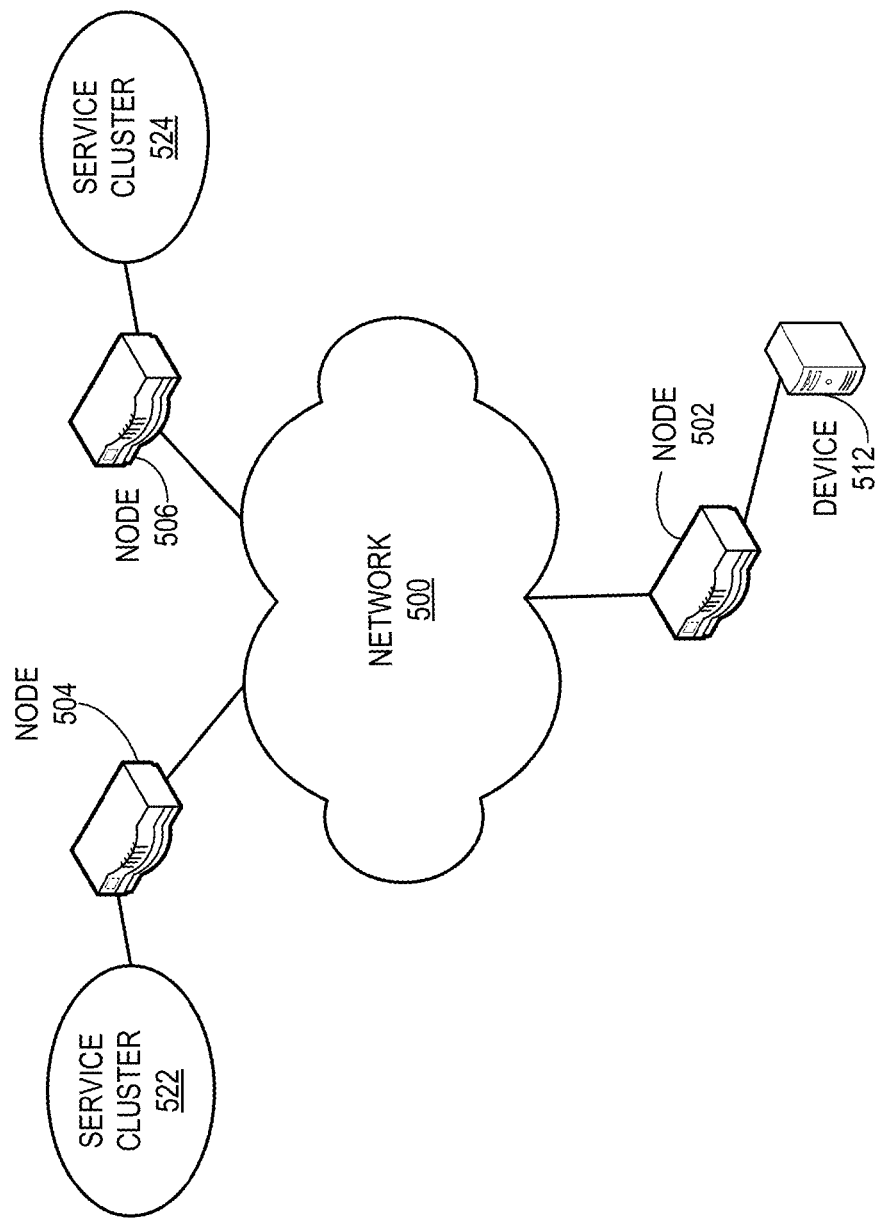
FIG. 5 illustrates exemplary service clusters in a CCN with explicit strategy feedback support, in accordance with an embodiment of the present invention.

In some embodiments, a node in a CCN can provide cloud services to a coupled device. However, this cloud service can be obtained from a plurality of service clusters. The node can use explicit strategy feedback to select a service cluster for cloud services. A service cluster can include one or more devices providing one or more services (e.g., content storage, security, etc). FIG. 5 illustrates exemplary service clusters in a CCN with explicit strategy feedback support, in accordance with an embodiment of the present invention. A network 500, which can be a CCN, is coupled to nodes 502, 504, and 506. Node 502 can communicate with nodes 504 and 506 via network 500. Node 502 provides cloud services to a device 512 coupled to node 502. Nodes 504 and 506 can operate as gateway nodes for service clusters 522 and 524, respectively.

During operation, service clusters 522 and 524 coupled to nodes 504 and 506, respectively, advertise that service clusters 522 and 524 provide a cloud service (e.g., using an interest comprising a network name associated with the service). Node 502 receives the advertisements and creates corresponding FIB entries. Node 502 can then forward an interest for the cloud service to service cluster 522 or 524. Upon receiving an interest for a cloud service from device 512, node 502 selects service cluster 522 or 524 for forwarding that service request. In other words, node 502 determines whether to send the service request via the egress interface associated with node 504 or 506.

This determination is based on the forwarding strategy taken by a strategy layer of node 502. The strategy layer makes decisions based on one or more forwarding strategies. Since both service clusters 522 and 524 advertise the service, node 502 has multiple options for forwarding the interest in its FIB. The strategy layer determines which entry associated with the service in the FIB should be used to forward the interest. Node 502 can request and receive explicit strategy feedback to determine the service cluster to which node 502 should send the interest. Node 502 sends an individual or piggybacked interest comprising the explicit strategy feedback request to nodes 504 and 506.

Upon receiving the explicit strategy feedback request, nodes 504 and 506 can further propagate the explicit strategy feedback request in service clusters 522 and 524, respectively. Nodes 504 and 506 receive explicit strategy feedback from service clusters 522 and 524, respectively. The explicit strategy feedback from a service cluster can include explicit strategy feedback from a plurality of servers. In some embodiments, nodes 504 and 506 aggregate the received explicit strategy feedback based on an aggregation policy, and send the aggregated explicit strategy feedback to node 502.

Upon receiving the aggregated explicit strategy feedback from nodes 504 and 506, in some embodiments, node 502 can store the aggregated explicit strategy feedback in the corresponding forwarding entries in its local FIB. If node 502 receives an interest for a service from device 512, the strategy layer of node 502 compares the aggregated explicit strategy feedback of service clusters 522 and 524, and determines the forwarding entry comprising a better aggregated explicit strategy feedback. Node 502 then identifies an egress interface associated with the determined forwarding entry and forwards the interest via the identified egress interface.

Apparatus and Computer System

Figure 6:
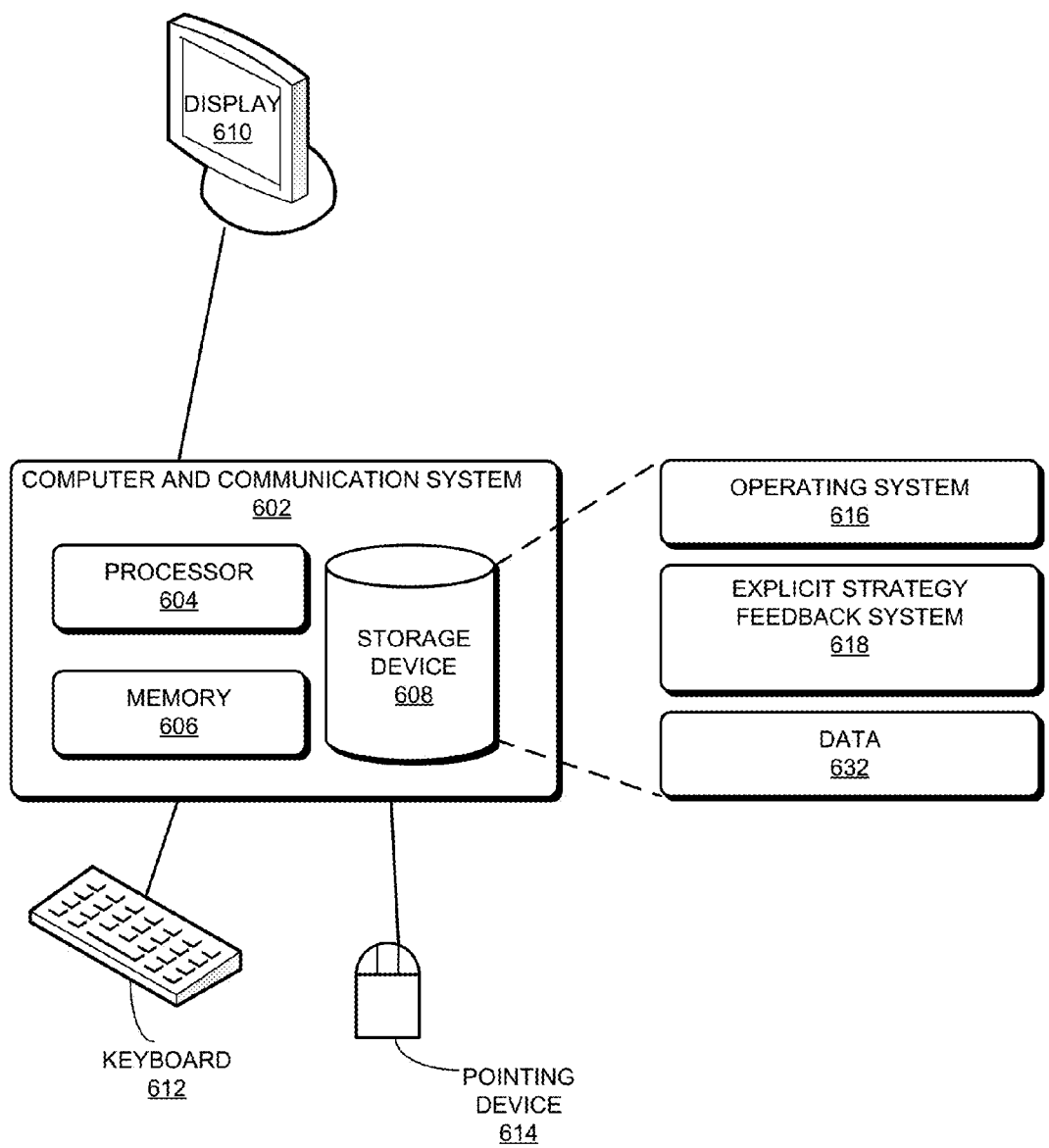
FIG. 6 illustrates an exemplary computer and communication system facilitating explicit strategy feedback in a CCN, in accordance with an embodiment of the present invention.

FIG. 6 illustrates an exemplary computer and communication system facilitating explicit strategy feedback in a CCN, in accordance with an embodiment of the present invention. Computer and communication system 602 includes a processor 604, a memory 606, and a storage device 608. Memory 606 can include a volatile memory (e.g., RAM) that serves as a managed memory, and can be used to store one or more memory pools. Furthermore, computer and communication system 602 can be coupled to a display device 610, a keyboard 612, and a pointing device 614. Storage device 608 can store an operating system 616, an explicit strategy feedback system 618, and data 632.

Explicit strategy feedback system 618 can include instructions, which when executed by computer and communication system 602, can cause computer and communication system 602 to perform methods and/or processes described in this disclosure. Specifically, explicit strategy feedback system 618 can facilitate explicit strategy feedback for the strategy layer of a node in a CCN. In some embodiments, explicit strategy feedback system 618 can be executed on a plurality of computer and communication systems, which are able to exchange data that describes the state of the operation associated with explicit strategy feedback system 618.

In summary, embodiments of the present invention provide a computer system and a method that facilitates explicit strategy feedback in a CCN. During operation, the system sends a first interest associated with an explicit strategy feedback request via an egress interface. This egress interface is in a plurality of egress interfaces associated with a same name in a forwarding table. An interest is location-independent and uniquely identifies the content object in the CCN and is routed based on the name in the CCN. The system stores one or more parameters received in response to the explicit strategy feedback request in an entry, which includes the name and the egress interface, in the forwarding table. The one or more parameters are associated with a first device. The system determines, for a second interest for a content object associated with the name, an egress interface from the plurality of egress interfaces based on the stored parameters.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method, comprising: sending, by a computing device, a first interest associated with an explicit strategy feedback request, which is generated by the computing device, via a first egress interface, wherein the first egress interface is in a plurality of egress interfaces mapped to a same name in a forwarding table, wherein an interest indicates the content object in a Content-Centric Network (CCN), wherein the interest is routed based on the name in the CCN, and wherein the explicit strategy feedback request indicates a request for a feedback regarding a forwarding strategy for the name; storing one or more parameters received in response to the explicit strategy feedback request in an entry in the forwarding table, wherein the one or more parameters are associated with a first device, wherein the entry comprises the name and the first egress interface, and wherein the one or more parameters relate to server and/or network cost and/or performance; determining, for a second interest for a content object associated with the name, the first egress interface from the plurality of egress interfaces based on the entry comprising the name, the first egress interface, and the stored parameters; and forwarding the second interest via the first egress interface to a producer node based on the explicit forwarding strategy received in response to the first interest request.

2. The method of claim 1, wherein the first interest is an individual interest for the explicit strategy feedback request.

3. The method of claim 1, wherein the first interest is for a content object associated with the name, and the explicit strategy feedback request is piggybacked in the first interest.

4. The method of claim 1, wherein the one or more parameters are received via an underlying Routing Information Base (RIB) storing a route associated with the name.

5. The method of claim 1, wherein the parameters received in response to the first interest associated with the explicit strategy feedback request are one or more of: server load, server disk space, server cost, storage cost, server processing power, network cost, expected service time, network congestion, network reliability, server energy load, server energy consumption, network energy load, and network energy consumption.

6. The method of claim 1, further comprising removing the one or more parameters from a response message associated with the first interest in response to determining that the response message has reached a boundary of an administrative domain.

7. The method of claim 1, wherein the one or more parameters are further associated with a second device, and wherein the one or more parameters are aggregated for the first and second devices based on an aggregation policy.

8. The method of claim 7, wherein the aggregation policy includes one or more of: a mean, a median, a minimum, a maximum, and an inclusive list.

9. A non-transitory computer-readable storage medium storing instructions that when executed by a computer cause the computer to perform a method, the method comprising: sending a first interest associated with an explicit strategy feedback request, which is generated by a computing device, via a first egress interface of the computing device, wherein the first egress interface is in a plurality of egress interfaces mapped to a same name in a forwarding table, wherein an interest indicates the content object in a Content-Centric Network (CCN), wherein the interest is routed based on the name in the CCN, wherein the explicit strategy feedback request indicates a request for a feedback regarding a forwarding strategy for the name; storing one or more parameters received in response to the explicit strategy feedback request in an entry in the forwarding table, wherein the one or more parameters are associated with a first device, wherein the entry comprises the name and the first egress interface, and wherein the one or more parameters relate to server and/or network cost and/or performance; determining, for a second interest for a content object associated with the name, the first egress interface from the plurality of egress interfaces based on the entry comprising the name, the first egress interface, and the stored parameters; and forwarding the second interest via the first egress interface to a producer node based on the explicit forwarding strategy received in response to the first interest request.

10. The non-transitory computer-readable storage medium of claim 9, wherein the first interest is an individual interest for the explicit strategy feedback request.

11. The non-transitory computer-readable storage medium of claim 9, wherein the first interest is for a content object associated with the name, and the explicit strategy feedback request is piggybacked in the first interest.

12. The non-transitory computer-readable storage medium of claim 9, wherein the one or more parameters are received via an underlying Routing Information Base (RIB) storing a route associated with the name.

13. The non-transitory computer-readable storage medium of claim 9, wherein the parameters received in response to the first interest associated with the explicit strategy feedback request are one or more of: server load, server disk space, server cost, storage cost, server processing power, network cost, expected service time, network congestion, network reliability, server energy load, server energy consumption, network energy load, and network energy consumption.

14. The non-transitory computer-readable storage medium of claim 9, wherein the method further comprises removing the one or more parameters from a response message associated with the first interest in response to determining that the response message has reached a boundary of an administrative domain.

15. The non-transitory computer-readable storage medium of claim 9, wherein the one or more parameters are further associated with a second device, and wherein the one or more parameters are aggregated for the first and second devices based on an aggregation policy.

16. The non-transitory computer-readable storage medium of claim 15, wherein the aggregation policy includes one or more of: a mean, a median, a minimum, a maximum, and an inclusive list.

17. A computer system, comprising: a processor; and a storage device coupled to the processor and storing instructions that when executed by a computer cause the computer to perform a method, the method comprising: sending, by a computing device, a first interest associated with an explicit strategy feedback request, which is generated by a computing device, via a first egress interface of the computing device, wherein the first egress interface is in a plurality of egress interfaces mapped to a same name in a forwarding table, wherein an interest indicates the content object in a Content-Centric Network (CCN), wherein the interest is routed based on the name in the CCN, and wherein the explicit strategy feedback request indicates a request for a feedback regarding a forwarding strategy for the name; storing one or more parameters received in response to the explicit strategy feedback request in an entry in the forwarding table, wherein the one or more parameters are associated with a first device, wherein the entry comprises the name and the first egress interface, and wherein the one or more parameters relate to server and/or network cost and/or performance; determining, for a second interest for a content object associated with the name, first egress interface from the plurality of egress interfaces based on the entry comprising the name, the first egress interface, and the stored parameters, and forwarding the second interest via the first egress interface to a producer node based on the explicit forwarding strategy received in response to the first interest request.

18. The computer system of claim 17, wherein the first interest is an individual interest for the explicit strategy feedback request.

19. The computer system of claim 17, wherein the first interest is for a content object associated with the name, and the explicit strategy feedback request is piggybacked in the first interest.

20. The computer system of claim 17, wherein the one or more parameters are received via an underlying Routing Information Base (RIB) storing a route associated with the name.

21. The computer system of claim 17, wherein the parameters received in response to the first interest associated with the explicit strategy feedback request are one or more of: server load, server disk space, server cost, storage cost, server processing power, network cost, expected service time, network congestion, network reliability, server energy load, server energy consumption, network energy load, and network energy consumption.

22. The computer system of claim 17, wherein the method further comprises removing the one or more parameters from a response message associated with the first interest in response to determining that the response message has reached a boundary of an administrative domain.

23. The computer system of claim 17, wherein the one or more parameters are further associated with a second device, and wherein the one or more parameters are aggregated for the first and second devices based on an aggregation policy.

24. The computer system of claim 23, wherein the aggregation policy includes one or more of: a mean, a median, a minimum, a maximum, and an inclusive list.

* * * * *